United States Patent [19]

Lee et al.

[11] Patent Number: 5,699,340
[45] Date of Patent: Dec. 16, 1997

[54] METHOD FOR CORRECTING ABERRATION DUE TO OPTICAL DISK TILT AND APPARATUS THEREFOR

[75] Inventors: Chul-woo Lee, Seoul; Kyung-hwa Rhim, Suwon; Pyong-yong Seong, Seoul; Chong-sam Chung, Sungnam, all of Rep. of Korea

[73] Assignee: Samsung Electronics Co., Ltd., Suwon, Rep. of Korea

[21] Appl. No.: 585,253

[22] Filed: Dec. 26, 1995

[30] Foreign Application Priority Data

Dec. 26, 1994 [KR] Rep. of Korea ............... 94-36891
Nov. 21, 1995 [KR] Rep. of Korea ............... 95-42613

[51] Int. Cl.$^6$ ............................................. G11B 7/095
[52] U.S. Cl. ............... 369/112; 369/54; 369/44.23; 369/44.32; 369/58
[58] Field of Search ................... 369/115.54, 44.23, 369/112, 44.37, 44.32, 58, 44.41, 109, 44.24

[56] References Cited

U.S. PATENT DOCUMENTS

| | | | |
|---|---|---|---|
| 4,780,865 | 10/1988 | Yamakawa | 369/44.32 |
| 5,216,649 | 6/1993 | Koike et al. | 369/44.23 |
| 5,302,834 | 4/1994 | Murao | 369/44.32 |
| 5,357,102 | 10/1994 | Ishika | 369/44.24 |
| 5,430,699 | 7/1995 | Matsubara et al. | 369/44.32 |
| 5,515,348 | 5/1996 | Ohsato | 369/44.23 |
| 5,523,989 | 6/1996 | Ishibashi | 369/44.32 |
| 5,546,367 | 8/1996 | Yoshimura et al. | 369/44.32 |

OTHER PUBLICATIONS

Naoya Eguchi et al., "Fast Disk Skew Servo for Optical Disk Pickup," *Technical Digest*, SOM'94, Symposium on Optical Memory 1994, Jul. 11–13, 1994, Tokyo, Japan.

*Primary Examiner*—Georgia Y. Epps
*Assistant Examiner*—Kim-Kwok Chu
*Attorney, Agent, or Firm*—Burns, Doane, Swecker & Mathis, L.L.P.

[57] ABSTRACT

In a method and an apparatus for correcting aberration due to optical disk tilt, the apparatus includes a correction plate through which a first light beam passes by an object lens in an optical disk, a light source and a photo detector for generating and receiving a second light beam to detect the magnitude of the optical disk tilt, respectively, and an actuator for inclining the correction plate based on the detected signal. The correction plate has the same optical properties as those of the substrate of the optical disk, irrespective of the optical pick surroundings and offset the aberration due to the optical disk tilt. Therefore, while the best performance of the optical pickup is ensured, adverse effects caused by the aberration due to the optical disk tilt can be eliminated through simple circuitry.

12 Claims, 5 Drawing Sheets

METHOD FOR CORRECTING ABERRATION DUE TO OPTICAL DISK TILT AND APPARATUS THEREFOR

BACKGROUND OF THE INVENTION

The present invention relates to a method for correcting aberration due to the tilt of an optical disk in an optical disk drive and an apparatus therefor, and more particularly, to a method for correcting aberration due to the tilt, which is caused by the increased aberration of an optical spot formed on the optical disk occurring when an optical disk tilts, and an apparatus suitable therefor.

General optical disk drives are provided with a turntable on which an optical disk is installed and rotated by a spindle motor. In such a disk drive, data read/write operations are accomplished by an optical pickup having an object lens which moves radially across the rotating disk and scans it with an optical spot. Here, to avoid the malfunction of the pickup and thereby accurately record and reproduce information, the stable rotation of the optical disk within the focal plane of the object lens must be maintained. During rotation, however, the optical disk may be subject to vibration due to poor loading, minor impacts, etc., thus generating errors in the focus and tracking of the object lens with respect to the optical disk. Since it is virtually impossible to fully suppress all such vibration of the optical disk, the focus and tracking errors are employed to minutely correct the positioning of the object lens, vertically and horizontally, according to the vibration of the optical pickup.

If the optical disk tilts due to vibration or is out of balance due to any deformation over time, the light spot defocuses even when the recording/reproducing plane of the optical disk coincides with the focus plane of the object lens. Due to such tilting, the reflective optical axis from the tilted optical disk also skews, causing the image of the light spot on the photo detector of the optical pickup to shift. As a result, sufficient light intensity for recording cannot be obtained at center of the light spot on the optical disk during recording and proper reproduction cannot be attained due to a deteriorated reproduction signal. Also, in such cases, since the optical spot shifts due to tilted optical axis of the reflected beam from the optical disk, errors are generated in the operation of the focusing and tracking servo of the object lens.

Accordingly, the above optical disk drive must perform correction for the aberration caused by the optical disk tilt.

To correct such aberrations, a method using a correction lens group consisting of a concave lens and a convex lens was presented at the '94 Symposium on Optical Memory (held at Waseda University, Tokyo). Here, each lens of the correction lens group, which is installed along the incident light beam path of the object lens, is driven to be shifted perpendicularly with respect to the optical axis depending on the degree of optical disk tilting. In other words, the optical axis of the incident light beam is refracted to offset the aberration due to the optical disk tilt.

In this method, however, only about half of the disk-tilt-induced aberration is corrected, which is not enough. Moreover, in addition to the added product cost due to the installation of two lenses and actuators for each, the thus-increased mass of the pickup tends to degrade the overall function.

SUMMARY OF THE INVENTION

Accordingly, it is an object of the present invention to provide a method for correcting aberration due to optical disk tilting by a simple method using a single transparent plate without using expensive lenses, and an apparatus suitable therefor.

To accomplish the above object, there is provided a method of correcting aberration due to optical disk tilt in an optical disk drive for performing recording and reproducing functions of information by focusing a first light beam onto an optical disk by an optical pickup object lens, the method comprising the steps of: installing a correction plate between the object lens and the optical disk to focus the first light beam onto the optical disk therethrough; projecting a second light beam onto the optical disk and receiving a reflective beam of a second light beam reflected from the optical disk to detect a signal indicating the magnitude of the tilt of the optical disk; and inclining the correction plate based on the signal detected depending on the magnitude of the tilt of the optical disk.

In addition, there is provided an apparatus of correcting aberration due to optical disk tilt in an optical disk drive for performing recording and reproducing functions of information by focusing a first light beam onto an optical disk by an optical pickup object lens, the apparatus comprising: a correction plate installed between the object lens and the optical disk and through which the first light beam passes; means for projecting a second light beam onto the optical disk and receiving a reflective beam of a second light beam reflected from the optical disk to detect a signal indicating the magnitude of the tilt of the optical disk; and means for moving the correction plate based on the signal detected depending on the magnitude of the tilt of the optical disk.

In the method and apparatus for correcting aberration due to optical disk tilting, according to the present invention, the correction plate preferably has the same thickness and refractive index as those of the substrate of the optical disk.

In detect the optical disk tilting, a light source generates the second light beam and a photo detector receives the reflective light beam of the second light beam, separately from the optical pickup for generating and receiving the first light beam for recording and reproduction. The light source and photo detector are preferably installed on a holder for supporting the objective lens of the optical pickup in a stable state so that the second light beam is not refracted into the correction plate. In driving the correction plate, a magnet of the driving actuator of the objective lens installed within the optical pickup may be adopted.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
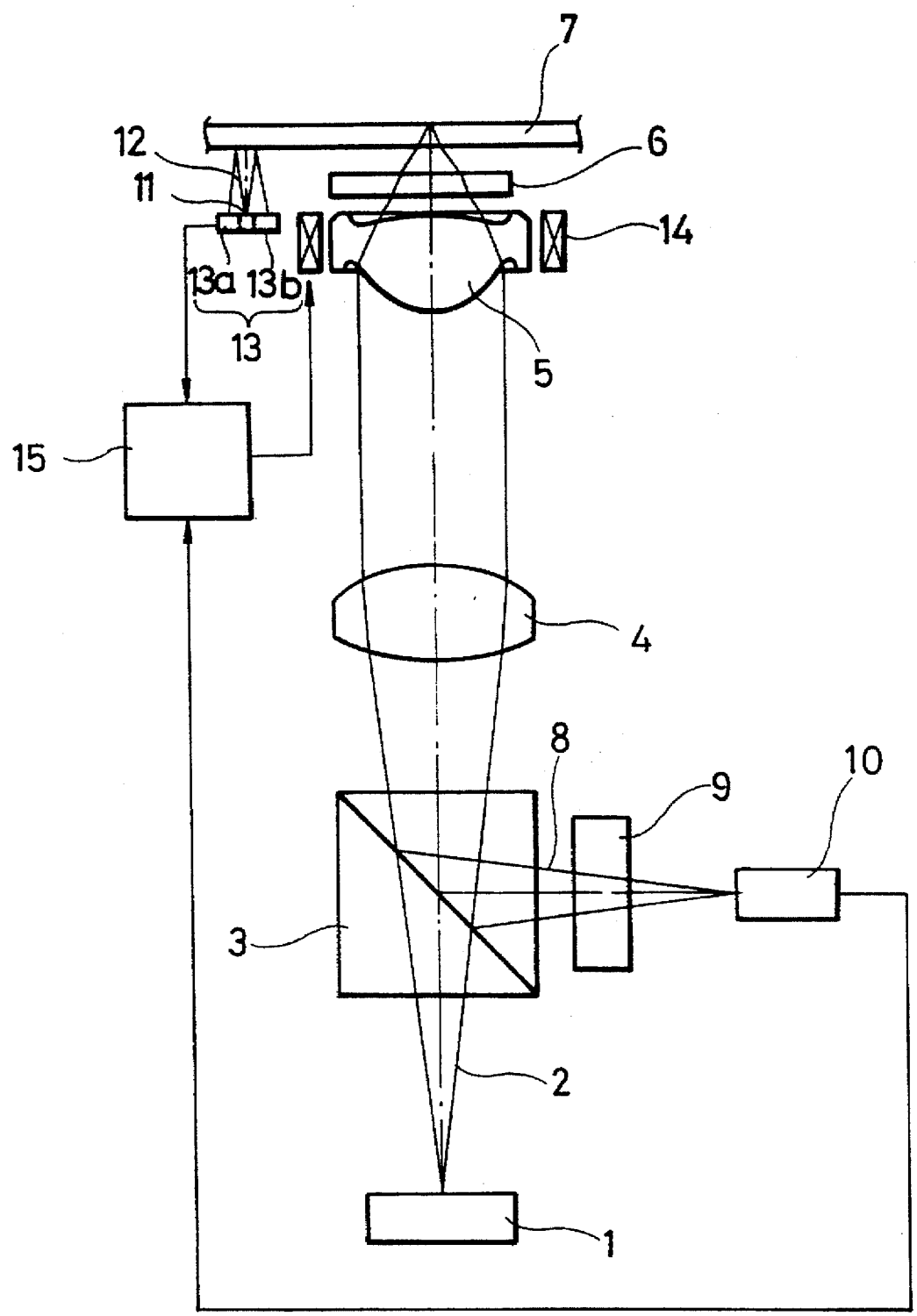
FIG. 1 shows an optical construction of an optical pickup for performing a method of correcting aberration due to an optical disk tilt according to the present invention.

As shown in FIG. 1, an optical pickup for implementing a method for correcting aberration due to optical disk tilt comprises a first light source 1 for generating a first light beam 2 for recording or reproducing information, a beam splitter 3 for transmitting the first light beam 2 toward an optical disk 7 and reflecting the reflected beam reflected from optical disk 7, a collimating lens 4 for collimating the first light beam passing through beam splitter 3, an object lens 5 for focusing the collimated first light beam onto optical disk 7, a correction plate 6 through which the first light beam focused by object lens 5, a detecting lens 9 for detecting the reflected beam reflected from beam splitter 4 after being reflected from optical disk 7, a first photo detector 10 for detecting a reproduction signal from the reflected beam passing through detecting lens 9, a second light source 11 for generating a second light beam 12 to impinge on optical disk 7, a second photo detector 13 for detecting a signal indicating the magnitude of tilt of optical disk 7, an actuator 14 for driving object lens 5 and correction plate 6, and a controller 15 for controlling the operation of actuator 14 according to the signal detected from first and second photo detectors 10 and 13.

Figure 2A:
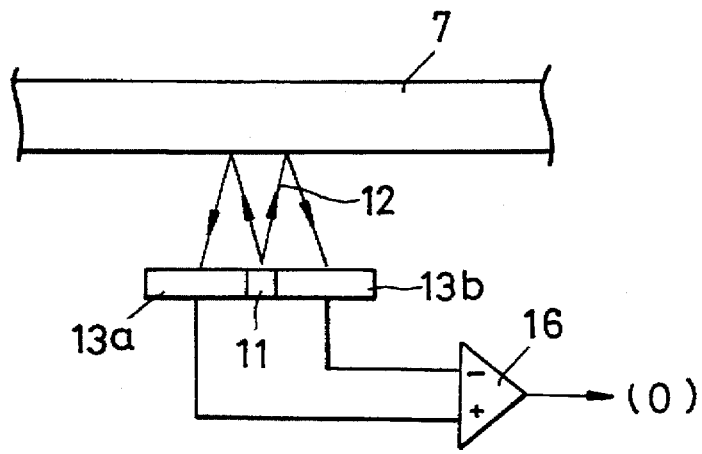
FIGS. 2A–2C illustrate the detection of the optical disk tilt in the present invention.
Figure 2B:
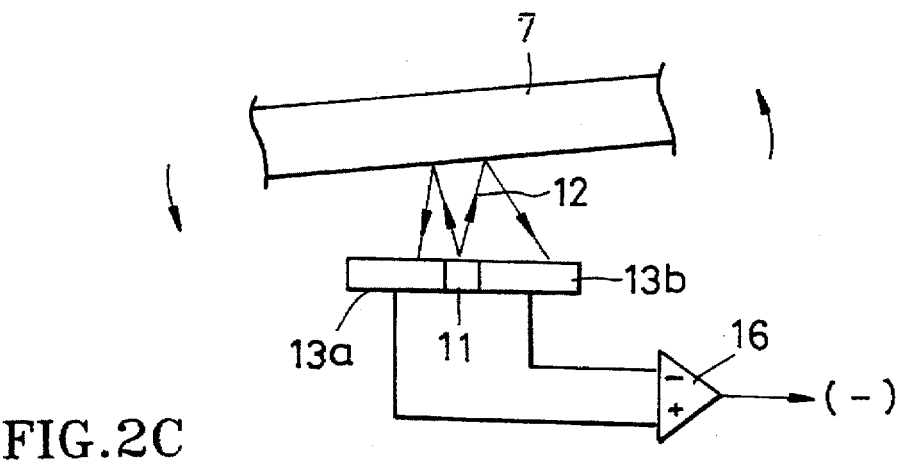
Figure 2C:
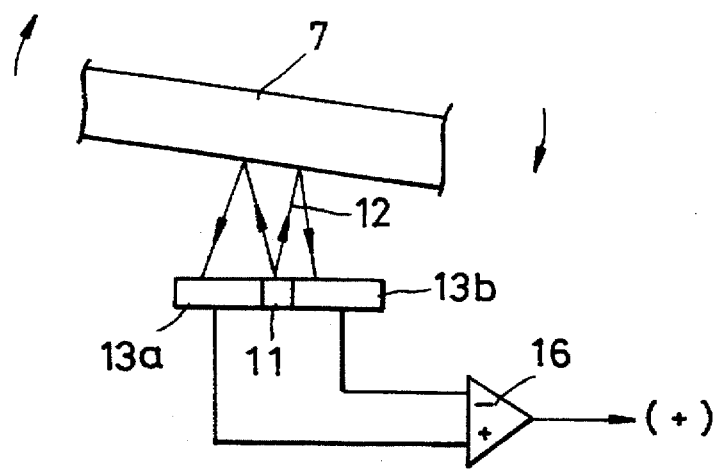

Referring to FIGS. 2A, 2B and 2C, the second light source 11 projects a second light beam 12 upwardly to the optical disk 7. The second photo detector 13 is divided into two regions 13a and 13b disposed in parallel at both sides of the second light source 11. The controller 15 includes a differential amplifier 16 for differentiating the signals detected in two regions 13a and 13b to extract a desired signal indicating the magnitude of the tilt of the optical disk 7. As shown in FIG. 2A, the second light beam 12 reflected from a horizontally maintained optical disk is received equally at the two regions 13a and 13b of the second photo detector 13, so that the detected signals have equal values. Thus, the signal value output from the differential amplifier 16 is zero and it is determined that the optical disk 7 is not tilted. As shown in both FIGS. 2B and 2C, if optical disk 7 tilts to either side, more of the reflected beam of the second light beam 12 is received (either at one region 13a or at the other region 13b) so that the differential amplifier 15 outputs an non-zero signal, i.e., a negative or positive signal. The amplitude of the signal of the differential amplifier 16 varies depending on the magnitude of the tilt of the optical disk 7. In other words, the tilt direction and magnitude of the optical disk 7 are known by the sign and amplitude of the signal extracted from the differential amplifier 16.

Figure 3A:
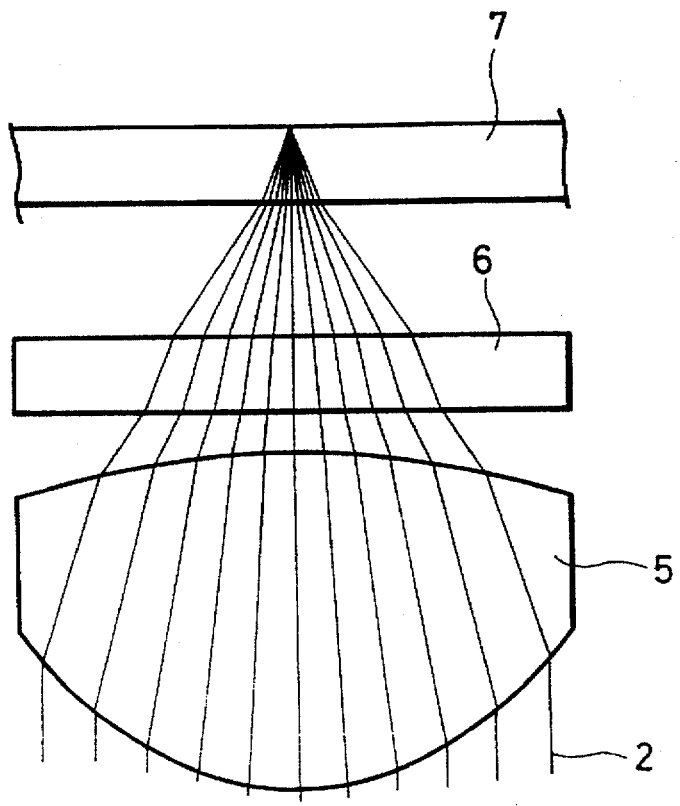
FIGS. 3A and 3B illustrate the state where the aberration due to the optical disk tilt is corrected according to the present invention.
Figure 3B:
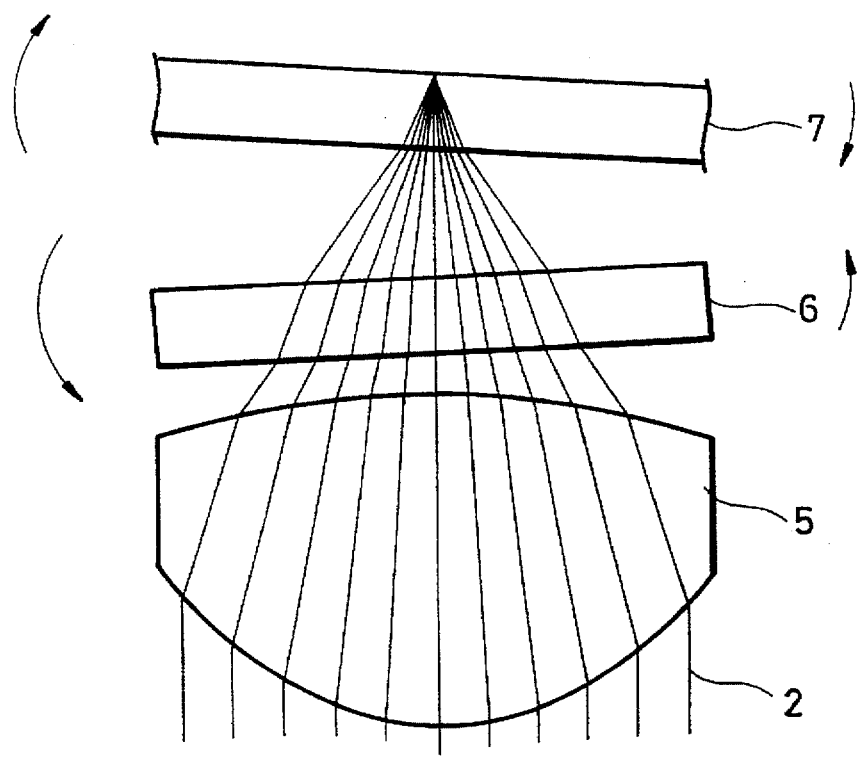

In the present invention, the aberration due to the optical disk tilt is corrected by the correction plate 6 which is inclined by the actuator 14 based on the extracted signal. In other words, as shown in FIG. 3A, when the optical disk 7 is not inclined, the correction plate 6 stays horizontal. However, as shown in FIG. 3B, when the optical disk 7 is inclined, correction plate 6 is moved in a complementary fashion with respect to the tilt direction of the optical disk 7. Here, if the correction plate 6 has the same thickness and refractive index as that of the substrate of the optical disk 7, the correction plate 6 is inclined at the same slope as that of the optical disk 7, thereby correcting the aberration of the first light beam 2.

Figure 4:
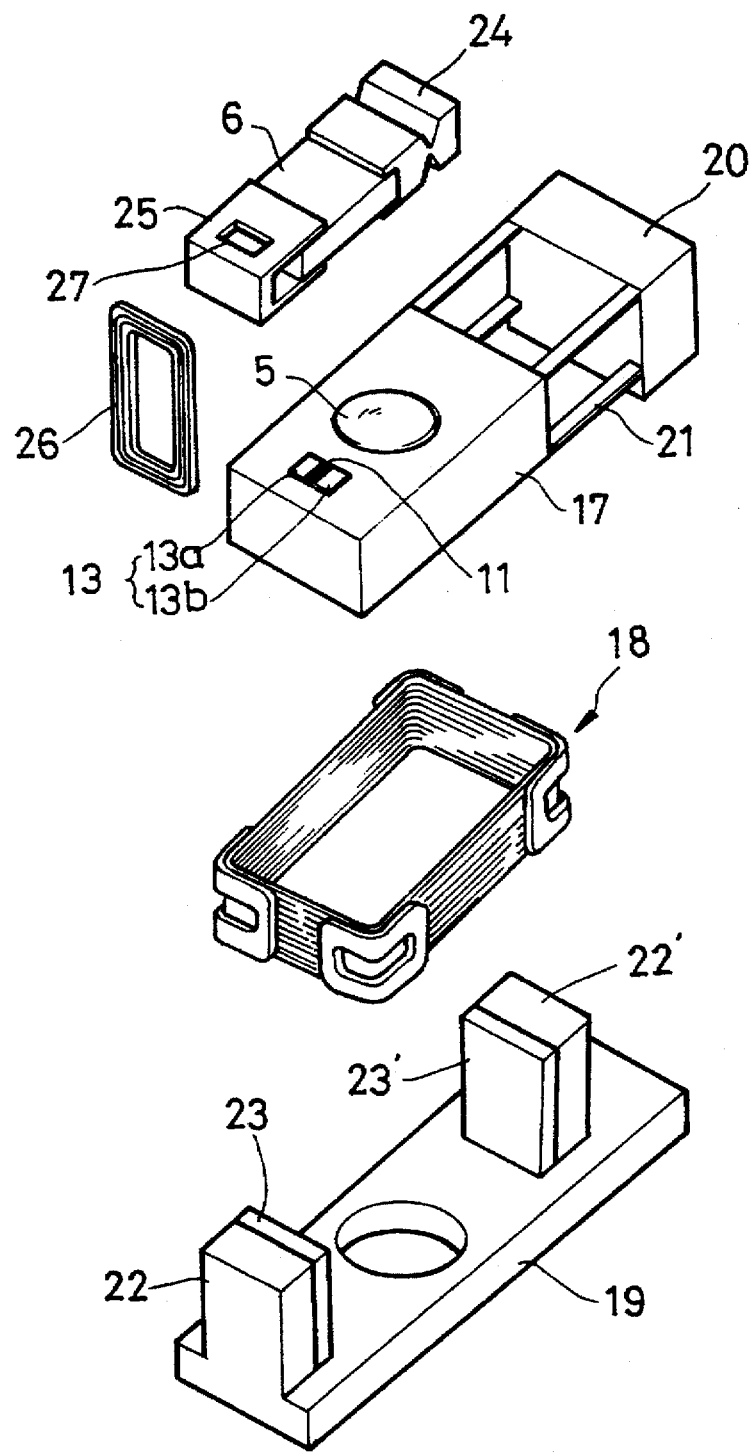
FIG. 4 is a partly exploded perspective view of an actuator used in the present invention.
Figure 5:
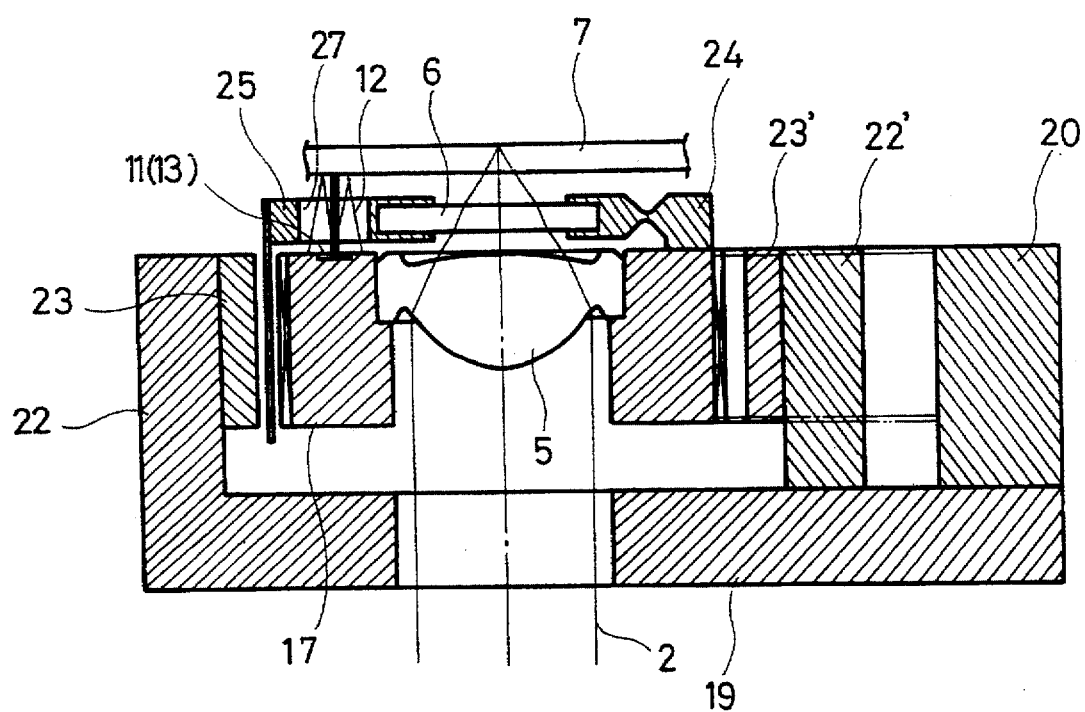
FIG. 5 is a cross-sectional view of the actuator shown in FIG. 4.

FIGS. 4 and 5 illustrate an actuator for driving one or the other of the object lens 5 and the correction plate 6. Here, a reference numeral 17 is a lens holder whereon the object lens 5 is loaded, with a coil 18 for driving the object lens 5 being wound around the sides thereof. The lens holder 17 is connected to a fixed block 20 installed on a base 19 via a spring 21, so as to be able to be moved vertically and horizontally with respect to base 19.

Yokes 22 and 22' are formed on base 19 to correspond to both side surfaces of lens holder 17. Magnets 23 and 23' for generating respective flux fields are fixed in yokes 22 and 22'. Thus, coil 18 is interlinked with the flux field generated from magnets 23 and 23' to move with lens holder 17 in the direction of the current applied thereto for compensating for the focus/track error.

The correction plate 6 whose sides are respectively connected to a hinge 24 fixed on lens holder 17 and to a support device 25 on which a coil 26 for driving the correction plate 6 is rotatable with respect to the hinge 24. The correction plate driving coil 26, being fixed on the support device 25 which is extended downward so as to be interlinked with the flux field generated in the magnet 22, ascends and descends according to the direction of the current flow so that the correction plate 6 is inclined.

The array of the second light source 11 and the second photo detector 13 is installed on the lens holder 17 under the support device 25 of the correction plate 6, in which the support device 25 has a hole 27 for passing the second light beam 12 between the optical disk 7 and the array.

As described above, the present invention employs the same magnets included in the conventional actuator for driving an object lens as the actuator for driving a correction plate, thereby simplifying implementation.

According to the present invention, since the tilt of an optical disk is detected by a light source and photo detector installed separately from an optical pickup for writing and reading information, the tilt information can be detected precisely. Also, in order to correct aberration due to the optical disk tilt, a correction plate having the same optical properties as those of the optical disk substrate is employed, that is, the configuration of the optical pickup is not changed. Thus, the aberration due to the optical disk tilt is perfectly corrected without deteriorating the optical performance of the optical pickup. In addition, owing to the simple structure of the embodiment of the present invention, the additionally required components do not greatly affect product cost, and the mass of the pickup is not significantly increased. Specifically, the present invention can be simply adopted to the actuator of the conventional optical pickup.

While a preferred embodiment has been described, variations thereto will occur to those skilled in the art within the scope of the present invention which are delineated by the following claims.

What is claimed is:

1. A method of correcting aberration due to optical disk tilt in an optical disk drive for performing recording and reproducing functions of information by focusing a first light beam onto an optical disk by an optical pickup object lens, said method comprising the steps of:

installing a correction plate between said object lens and said optical disk to focus said first light beam onto said optical disk therethrough;

projecting a second light beam onto said optical disk and receiving a reflective beam of a second light beam reflected from said optical disk to detect a signal indicating the magnitude of the tilt of said optical disk; and inclining said correction plate based on said signal detected depending on the magnitude of the tilt of said optical disk.

2. A method of correcting aberration due to optical disk tilt according to claim 1, wherein said correction plate has the same thickness and refractive index as that of the substrate of said optical disk.

3. A method of correcting aberration due to optical disk tilt according to claim 1, wherein said second light beam is generated from a light source separately from that of said optical pickup and is received by a separate photo detector.

4. A method of correcting aberration due to optical disk tilt according to claim 1, wherein said correction plate is driven using a magnet for generating a flux field and a coil interlinked with said flux field and ascending and descending depending on a sign and amplitude of the signal detected from the reflective beam of said second light beam.

5. An apparatus of correcting aberration due to optical disk tilt in an optical disk drive for performing recording and reproducing functions of information by focusing a first light beam onto an optical disk by an optical pickup object lens, said apparatus comprising:

- a correction plate installed between said object lens and said optical disk and through which said first light beam passes;
- detecting means for projecting a second light beam onto said optical disk and receiving a reflective beam of a second light beam reflected from said optical disk to detect a signal indicating the magnitude of the tilt of said optical disk; and
- means for moving said correction plate based on said signal detected depending on the magnitude of the tilt of said optical disk.

6. An apparatus of correcting aberration due to optical disk tilt according to claim 5, wherein said correction plate has the same thickness and refractive index as those of the substrate of said optical disk.

7. An apparatus of correcting aberration due to optical disk tilt according to claim 5, wherein said detecting means includes a light source for generating said second light beam and a photo detector for receiving the reflective light beam of said second light beam.

8. An apparatus of correcting aberration due to optical disk tilt according to claim 7, wherein said photo detector has two regions, said two regions being arranged at sides of said light source.

9. An apparatus of correcting aberration due to optical disk tilt according to claim 5, wherein said correction plate driving means includes a magnet for generating a flux field and a coil interlinked with said flux field and ascending and descending depending on a sign and amplitude of the signal detected from the reflective beam of said second light beam, said correction plate rotating according to the elevation of said coil.

10. An apparatus for correcting aberration due to disk tilt in an optical disk drive including a recording and reproducing optical pickup having an actuator with an object lens for focusing a first light beam onto an optical disk, a lens holder being resiliently supported to move vertically and horizontally and whereto said object lens is held, a magnet for generating a flux field for the focusing and tracking of said object lens and coils interlinked with said flux field and moving with said lens holder, said apparatus comprising:

- a correction plate through which said first light beam passes;
- a hinge installed on said lens holder and connected to one side of said correction plate for rotatably supporting said correction plate;
- a plate driving coil connected to the other end of said correction plate to be interlinked with the magnetic flux generated from said magnet and ascending and descending according to the current applied thereto; and
- detecting means for projecting a second light beam onto said optical disk and receiving the reflected beam of said second light beam reflected from said optical disk to detect a signal indicating the magnitude and direction of tilt of said optical disk.

11. An apparatus for correcting aberration due to optical disk tilt as claimed in claim 10, wherein detecting means comprises a light source for generating a second light beam separately from that of said optical pickup and a photo detector for receiving the reflected beam of said second light beam reflected by said optical disk, said light source and said photo detector are installed on said lens holder.

12. An apparatus for correcting aberration due to optical disk tilt as claimed in claim 11, wherein said photo detector has two regions, each of said two regions is arrayed at the sides of said light source.

* * * * *